United States Patent [19]

Clark

[11] Patent Number: 4,478,674
[45] Date of Patent: Oct. 23, 1984

[54] APPARATUS FOR SUPPORTING AND ALIGNING SPLICING TAPE ON A SPLICING WHEEL

[75] Inventor: Richard L. Clark, Burlington, N.C.

[73] Assignee: Concept Design, Inc., Burlington, N.C.

[21] Appl. No.: 424,283

[22] Filed: Sep. 27, 1982

[51] Int. Cl.³ .......................... B31F 5/06; B65H 69/06
[52] U.S. Cl. ...................................... 156/505; 156/506; 156/517; 156/519; 156/521
[58] Field of Search ............... 156/505, 506, 517, 519, 156/521, 502, 568, 157, 304.3, 518, 520

[56] References Cited

U.S. PATENT DOCUMENTS

| | | | |
|---|---|---|---|
| 3,960,641 | 6/1976 | Pedersen | 156/519 |
| 4,052,249 | 10/1977 | Bruce et al. | 156/521 |
| 4,230,520 | 10/1980 | Morgan | 156/505 |
| 4,328,066 | 5/1982 | Kiuchi et al. | 156/157 |

FOREIGN PATENT DOCUMENTS 2751236  5/1979  Fed. Rep. of Germany.

*Primary Examiner*—Michael Wityshyn
*Attorney, Agent, or Firm*—W. Thad Adams, III

[57] ABSTRACT

A tape splicing apparatus (30) is disclosed of the type wherein splicing tape ("T") is applied to a splicing tape applicator wheel (85) having planar, tape carrying surfaces (85a-d). The applicator wheel (85) moves to and from two tape ends ("A" and "L") to be spliced whereby a tape carrying surface (85a) contacts the two tape ends ("A" and "L") and applies the splicing tape ("T") thereto. The improvement disclosed maintains the splicing tape ("T") in lateral and longitudinal alignment with each tape carrying surface (85a-d). The applicator wheel (85) is mounted between two spaced-apart walls of a splice block (51) define first and second supports which lie flush with and overlap the tape carrying surfaces (85a-d) of applicator wheel (85) on both its axial sides.

4 Claims, 18 Drawing Figures

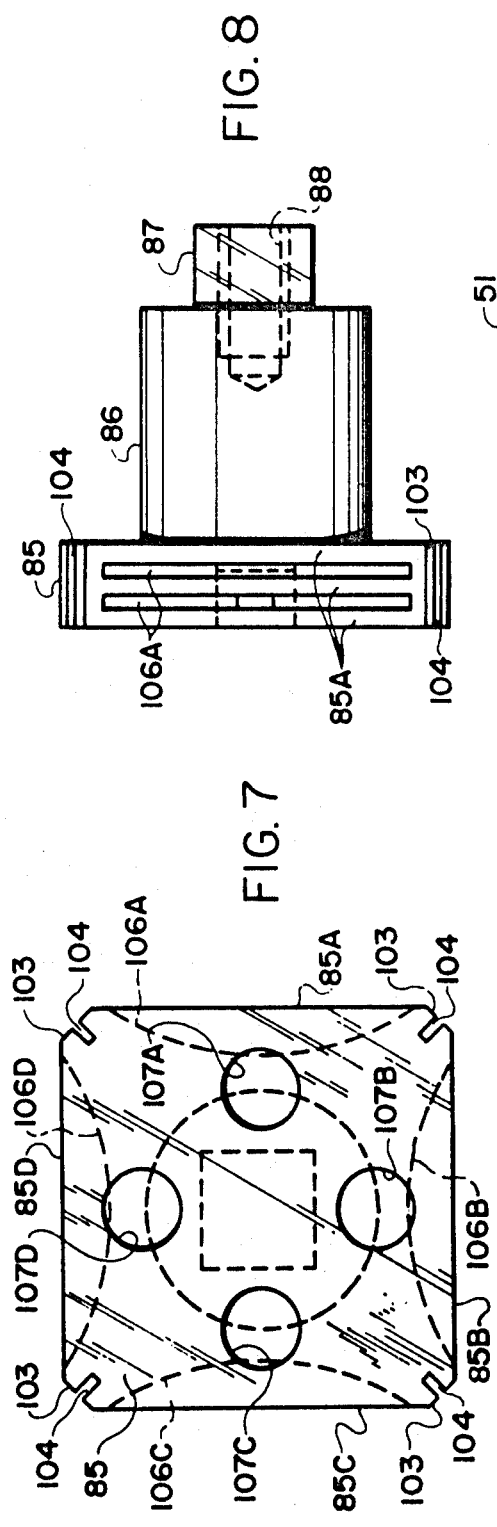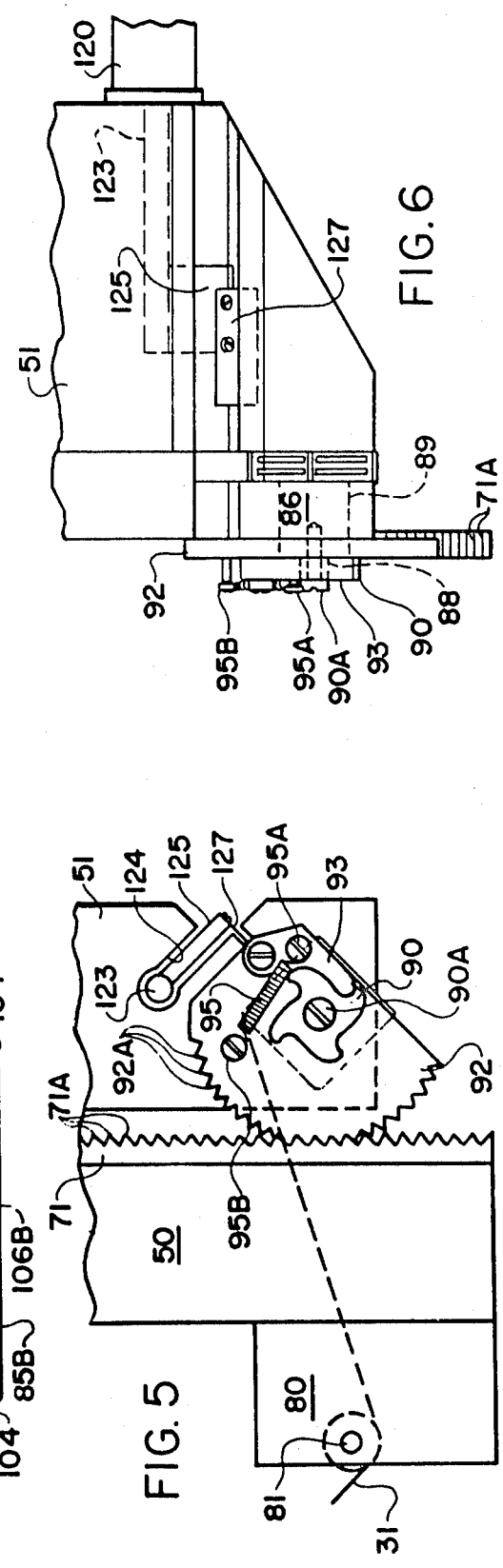

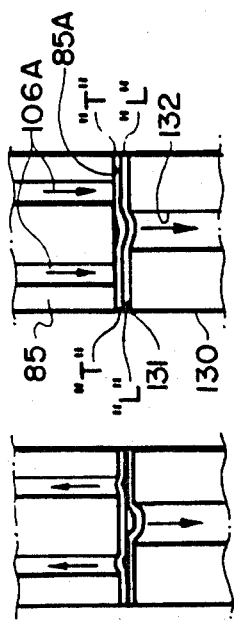
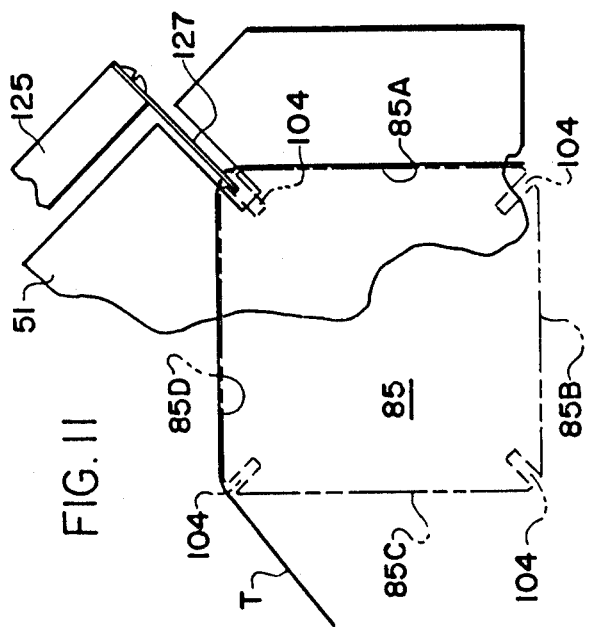
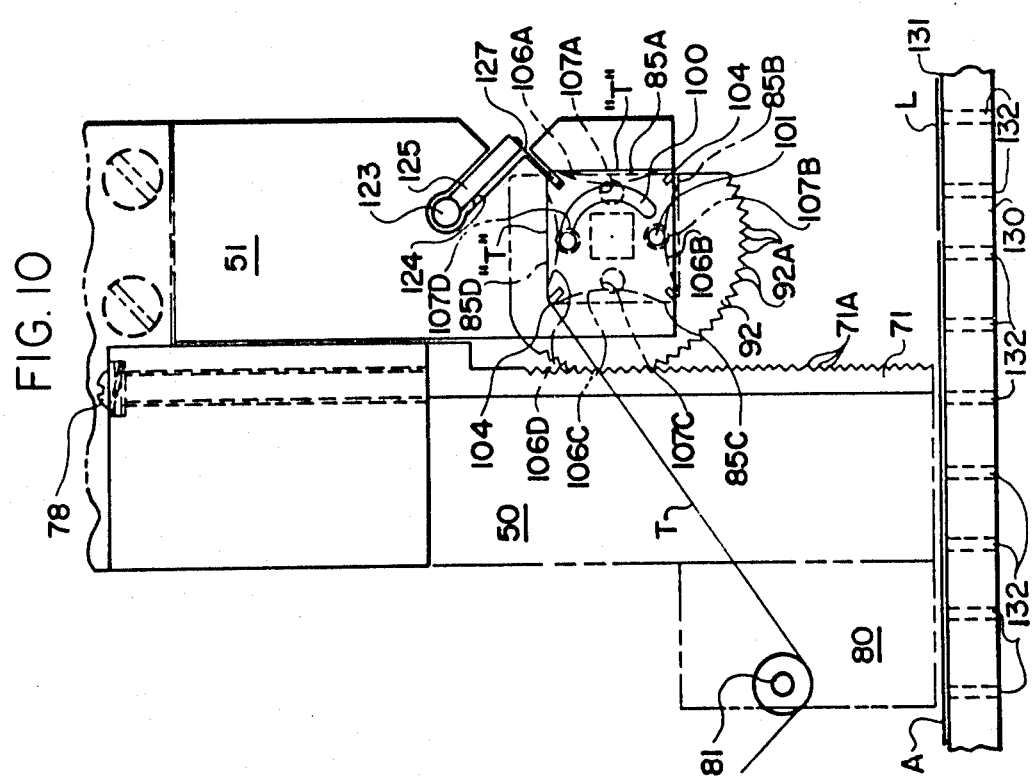
FIG. 16 PRIOR ART    FIG. 17
FIG. 11
FIG. 10

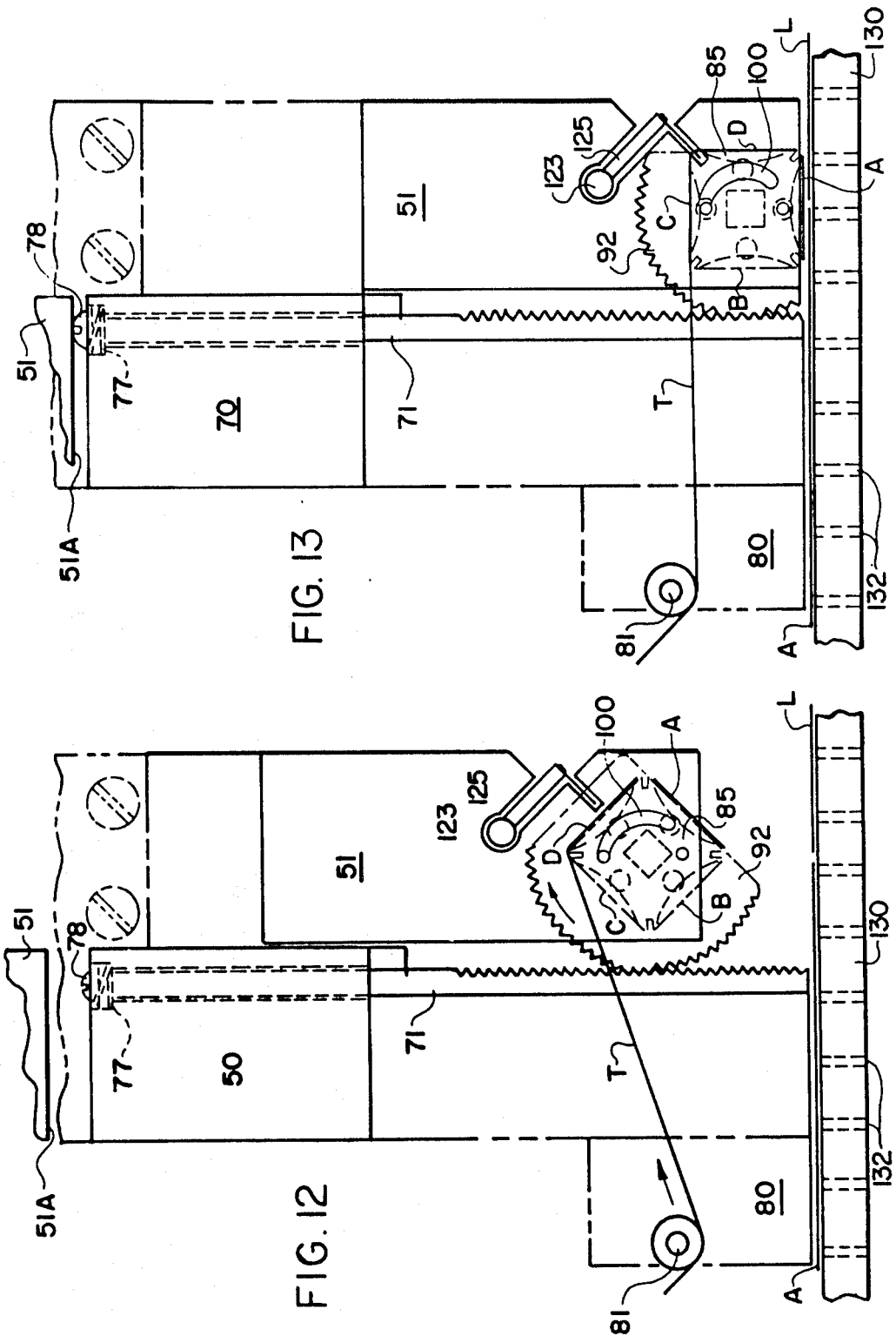

APPARATUS FOR SUPPORTING AND ALIGNING SPLICING TAPE ON A SPLICING WHEEL

TECHNICAL FIELD AND BACKGROUND OF THE INVENTION

This invention relates to an apparatus for supporting and aligning splicing tape on a splicing tape applicator wheel. The applicator wheel of the type disclosed in this application is used to apply splicing tape to two adjacent tape ends. The invention has application in processing audio or video tape, as well as photographic film and other similar products. As described below, the splicing tape is applied by an applicator wheel which reciprocates into and out of contact with the tapes to be spliced. Means selectively rotate the applicator wheel so that a new segment of splicing tape is available during each reciprocation.

The particular disclosure of this application is to a splicing apparatus mounted on a high-speed audio cassette winder. A standard audio cassette comprises a plastic shell within which is mounted two rotatable spools. When purchased by the user, the cassette generally has a leader attached to each spool and a length of either blank or pre-recorded magnetic tape with its two ends attached to the respective lengths of leader. The most common way of winding the blank or pre-recorded tape into the cassette is to begin with a cassette consisting of a shell with two spools and a short length of leader tape—one end connected to one spool and the other end connected to the other spool. The cassette is fed into an automatic, high-speed tape winder which extracts the leader tape from the tape opening in the bottom of the shell and cuts the leader into two separate lengths, one attached to each of the spools. The tape to be wound into the cassette is then spliced to one of the leaders. The spool to which that leader is attached is then rotated at high speed, thereby winding a pre-determined length of tape onto the spool. The recording tape is then cut and the tail of the tape just wound onto the spool is spliced to the length of the leader on the other spool. Slack in the tape is taken up and the cassette is then ejected. Another empty cassette takes its place and the same process is repeated.

As the winding speed of automatic cassette winders is increased, more and more stress is placed on the splice between the leader and recording tape. Consequently, each splice must be made quickly, accurately and in such a way as to ensure maximum possible contact between the splicing tape and the magnet tape and leader being spliced.

Specifically, the splice is made by butting one end of the magnetic tape to a piece of leader and applying a piece of adhesive splicing tape across the butted ends. In order for the splice to hold during subsequent winding and rewinding, substantially the entire adhesive surface of the splicing tape must be in intimate contact with either the magnetic tape or leader. Preferably, the splice should be made with the butted ends in the center of the splicing tape so that both the magnetic tape and leader are held by equal amounts of adhesive. The splicing tape is approximately the same width as the recording tape and leader. Therefore, it should be applied in parallel and lateral alignment with the two tape ends.

The conventional splicing operation involves feeding a continuous length of adhesive splicing tape from a roll onto a surface which reciprocates back and forth between a splicing tape receiving position and a splicing tape applying position in contact with the recording tape and leader. Usually, the surface of the splicing tape applicator is approximately the same width as the splicing tape and the recording tape and leader. Therefore, the splicing tape must be very accurately aligned on the applicator before application of the splice in order to assure that the splicing tape is placed in the proper position across the butted ends of the magnetic tape and leader in lateral and longitudinal alignment. Should the splicing tape not be correctly positioned on the applicator surface, the tape may be skewed or laterally offset from the surface of the magnetic tape and leader. This creates a weak splice since some of the adhesive is not holding the spliced tapes together. In addition, it creates a projection beyond the tape winding path which can snag on machine parts or in the cassette itself, causing a break in the splice or excessive drag during operation of the cassette.

This problem is particularly apparent in applicators wherein the splicing tape is held on the applicator surface by means of suction. A misalignment in the splicing tape supply relative to the applicator surface or misalignment caused by the action of cutter blades on the splicing tape cannot be corrected by suction. Should the misalignment between the splicing tape and the applicator surface be sufficiently severe, one or more suction ports may be exposed. The dynamic air pressure through the suction ports may deform the splicing tape, resulting in an even more serious misalignment of the splice.

SUMMARY OF THE INVENTION

Therefore, it is an object of the invention to provide an apparatus for supporting and aligning splicing tape on a splice applicator.

It is another object of the present invention to provide an apparatus for defining a path relative to the splice applicator which guides the splicing tape onto the tape applying surface of the splice applicator and maintains proper lateral and longitudinal alignment of the splicing tape with two ends to be spliced during movement of the splice applicator.

These and other objects and advantages of the present invention are achieved in the preferred embodiment of the apparatus below by providing a tape splicing apparatus of the type wherein splicing tape is applied to a splicing tape applicator having at least one planar tape carrying surface. The applicator is adapted for movement to and from two tape ends to be spliced, whereby the tape carrying surface contacts the two tape ends and applies the splicing tape thereto. A first support lies flush with and overlaps at least a part of the tape carrying surface of the applicator on one axial side thereof and a second support lies flush with and overlaps at least a part of the tape carrying surface on the other side. Means cooperate with the first and second supports and with the applicator for exposing the tape carrying surface beyond the first and second supports during its movement to the tape ends to be spliced and prior to impact therewith. The tape carrying surface is thereby permitted to impact the tapes to be spliced without interference from the first and second supports.

According to the preferred embodiment described below the splicing tape applicator comprises an applicator wheel having a plurality of planar tape carrying peripheral surfaces. The applicator wheel is mounted for simultaneous straight line and rotational movement to and from the two tape ends to be spliced whereby successive pre-determined ones of said tape carrying surfaces contact the two tape ends and apply the splicing tape in lateral and longitudinal alignment therewith.

In accordance with the embodiment of the apparatus disclosed herein, simultaneous straight line and rotational movement occurs through the cooperation of a normally stationary rack and a rotating rack gear on which the applicator wheel is mounted. Reciprocation of the applicator wheel is accomplished by means of an air cylinder. The splicing tape is held on each tape carrying surface by means of suction through ports in the tape carrying surface.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

Figure 15:
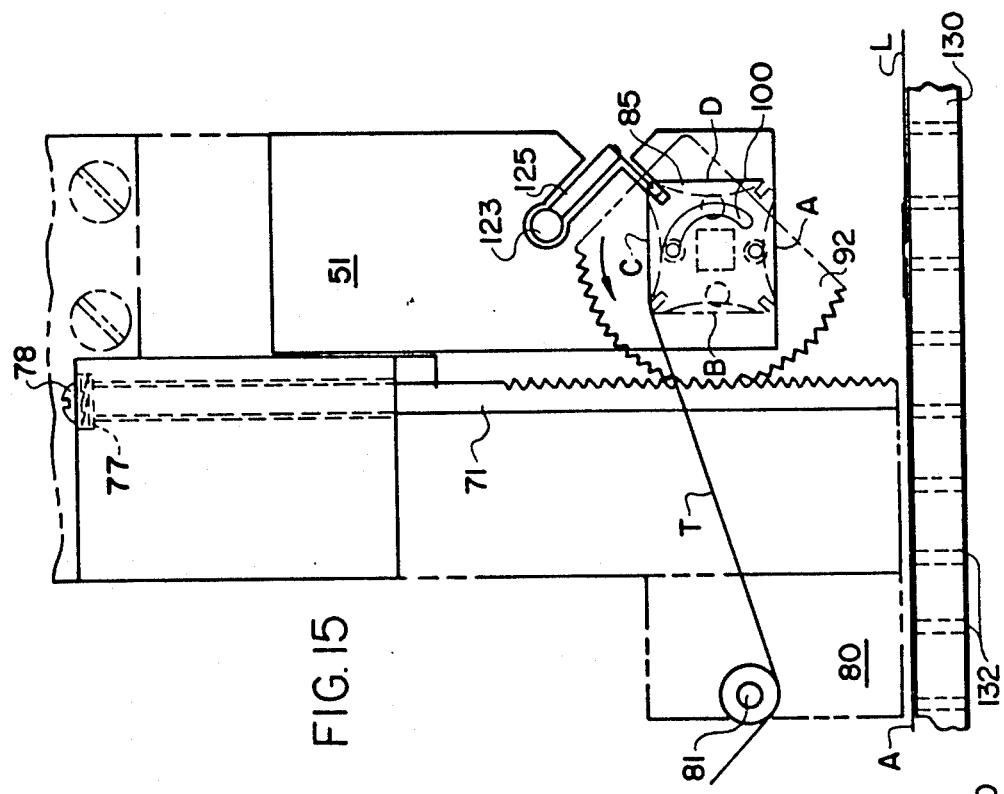
Figure 14:
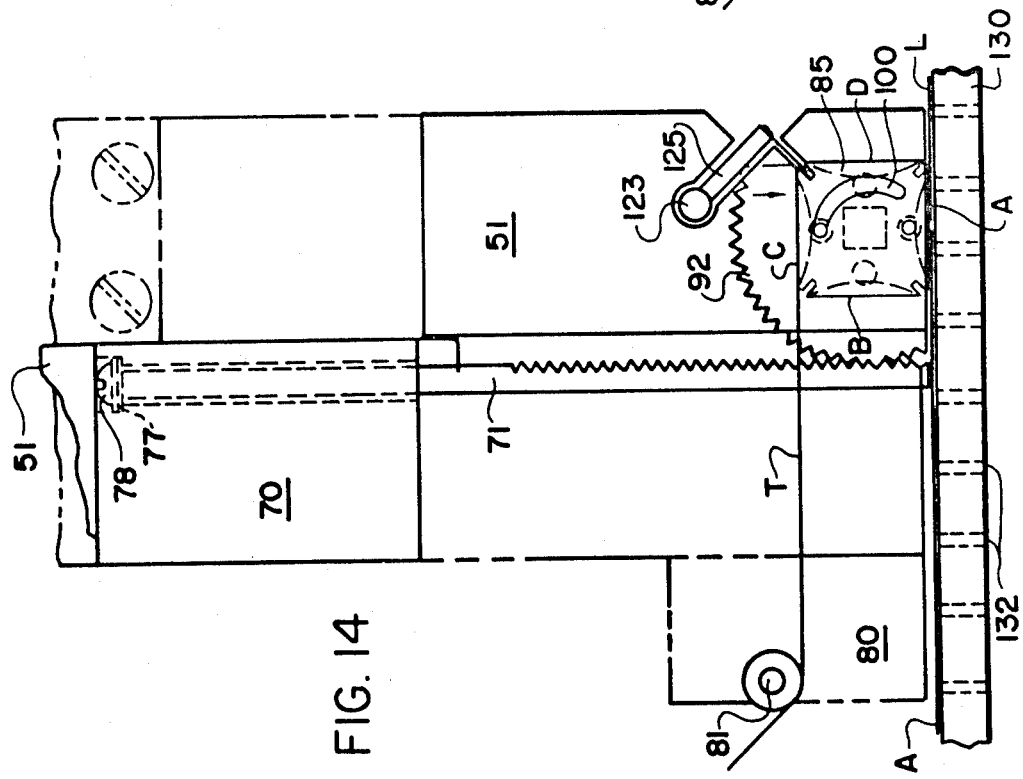
Figure 18:
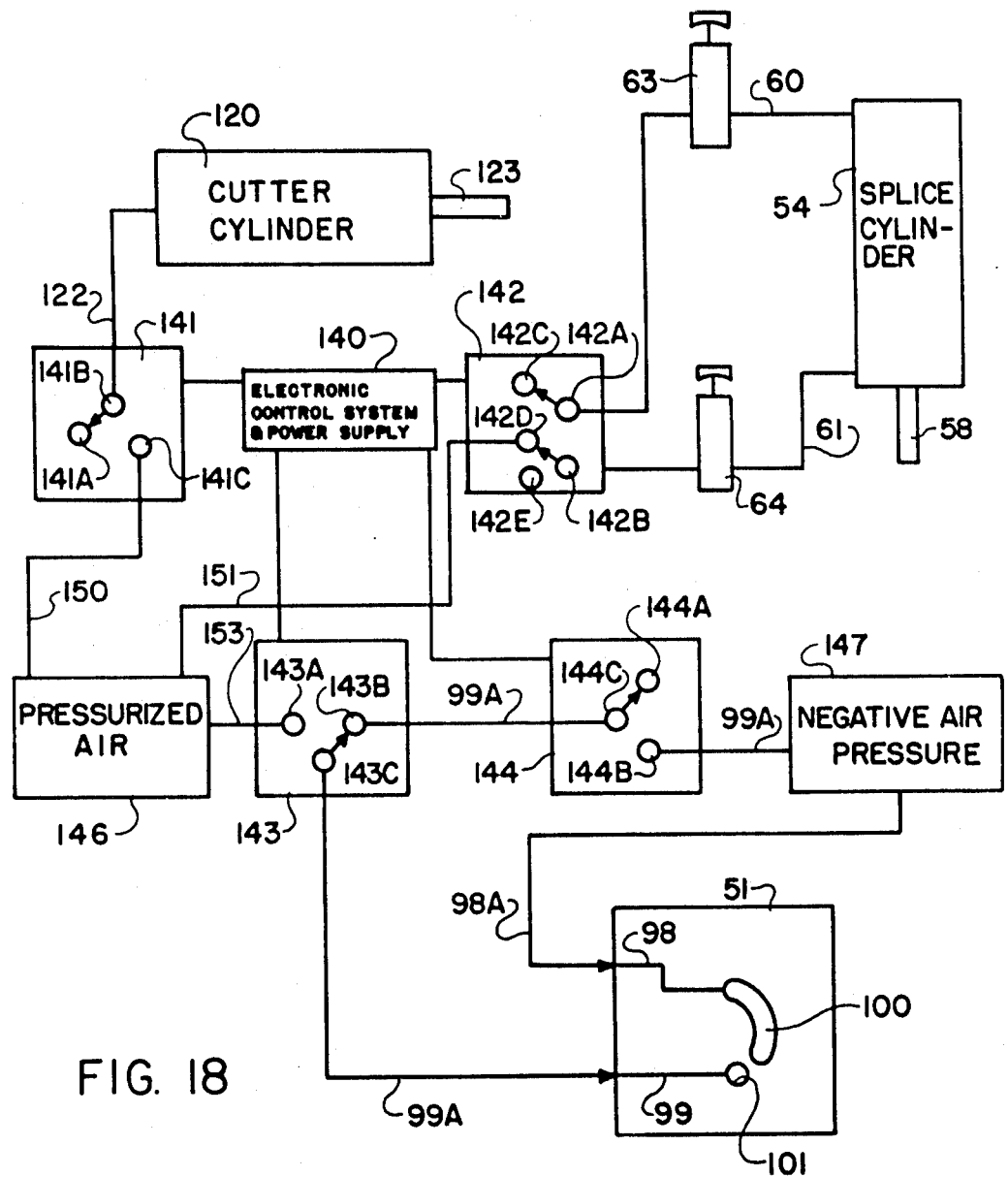

FIG. the ratchet and pawl assembly of the applicator wheel and rack gear assembly;

FIG. 6 is the view shown in FIG. 5 from another angle;

FIG. 7 is a front elevational view of the applicator wheel according to the present invention;

FIG. 8 is a side elevational view of the applicator wheel according to the present invention;

FIG. 9 is a perspective view of the applicator wheel according to the present invention;

FIG. 10 is a fragmentary side elevational view of the splicer according to the present invention;

FIG. 11 is a schematic view of the cutter blade assembly and applicator wheel showing cooperation therebetween;

FIG. 12 is a fragmentary side elevational view of the splicer during downward movement of the applicator wheel in the same position as in FIG. 5;

FIG. 13 is a fragmentary side elevational view of the splicer showing the applicator wheel with a tape-carrying face parallel to the tapes to be spliced;

FIG. 14 is a fragmentary side elevational view of the splicer as a length of splicing tape is applied to the two tapes to be spliced;

FIG. 15 is a fragmentary side elevational view of the splicer during reciprocation of the applicator wheel out of contact with the spliced tapes;

FIG. 16 is a schematic view showing interreaction of a hypothetical prior art splice bed and applicator wheel;

FIG. 17 is a schematic view showing cooperation of the vacuum on the splice bed and positive pressure on the applicator wheel cooperating to enhance contact between the splicing tape and the tapes being spliced; and, FIG. 18 is a schematic view of the pneumatic system, electronic control system and power supply of the splicer.

DESCRIPTION OF THE PREFERRED EMBODIMENT

Referring now specifically to the drawings, an audio tape cassette winder is shown and generally designated at broad reference numeral 10. Winder 10 comprises a console 11 within which are mounted the major electrical, pneumatic and mechanical operating parts. Console 11 has a front cover 12 which supports a rotatably driven audio tape supply reel 14 onto which is wound a supply of magnetic tape 16; a tape leader extractor assembly 17; a cassette supply tray 19 which holds a plurality of cassettes "C"; a cassette winding spindle 21; a defective cassette rejector assembly 22; and a stacking trough 24 for finished cassettes. A pair of vacuum take-up columns 25 and 26 selectively exert a vacuum force on audio tape to positively control tape tension as it is unwound from the supply reel 14 and wound onto cassette "C" by cassette winding spindle 21. A control panel 28 enables the operator to manipulate various functions of winder 10. Finally, a tape splicing apparatus 30 according to the present invention is mounted on front panel 12 and dispenses adhesive splicing tape "T" from a supply spool 31.

Supply reel 14 may be wound with unrecorded audio tape which is then used to produce "blank" cassettes to be used for later recording. Alternatively, supply reel 14 may be wound with tape containing a series of identical recordings ("albums") of music, speech or other audio signals. A low frequency "Q" signal is recorded onto the audio tape between each album and indicates the end of one album and the beginning of the next. Therefore, in loading cassettes with pre-recorded tape, a "Q" signal sensor is provided which stops the movement of the tape and permits the tape to be severed between the albums. The various electrical, pneumatic and mechanical components used to drive the supply reel sense the presence of each "Q" signal, cut the audio tape between albums, extract the leader from each cassette and prepare the leader for splicing; wind each cassette with a pre-determined amount of audio tape and eject the cassette to make room for the next one are all part of the prior art and are not the invention per se of this application.

Patents examplary of the prior art referred to above include U.S. Pat. Nos. 3,717,314 and 3,753,834.

Figure 2:
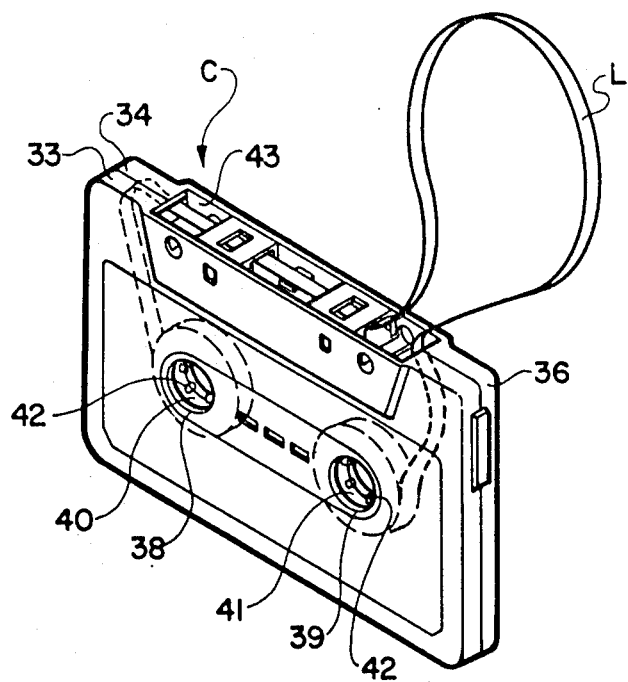
FIG. 2 is a perspective view of a conventional audio cassette.

The splicer 30 which will be described in detail below is operable for splicing a wide variety of tapes, sheets, films and the like. For illustrative purposes, splicer 30 will be described with reference to an industry standard audio cassette "C", as shown in FIG. 2. Cassette "C" comprises two case segments 33 and 34 which are mated together and adhered by adhesive or screws to form a cassette shell 36. Shell 36 has two through holes 38 and 39 between which are mounted, respectively, rotatable drums 40 and 41. Drums 40, 41 are provided with a plurality of teeth 42 around their inner circumference which mate with teeth on the winding spindle 21 of winder 10 and also with any standard recorder or playback unit. One end of a short length of leader "L" is attached to each of the drums 40 and 41. In this form cassette "C" is loaded into winder 10 and a pre-determined length of tape is wound onto either drum 40 or 41. Access to the tape is obtained through a bottom opening 43 in shell 36.

Figure 3:
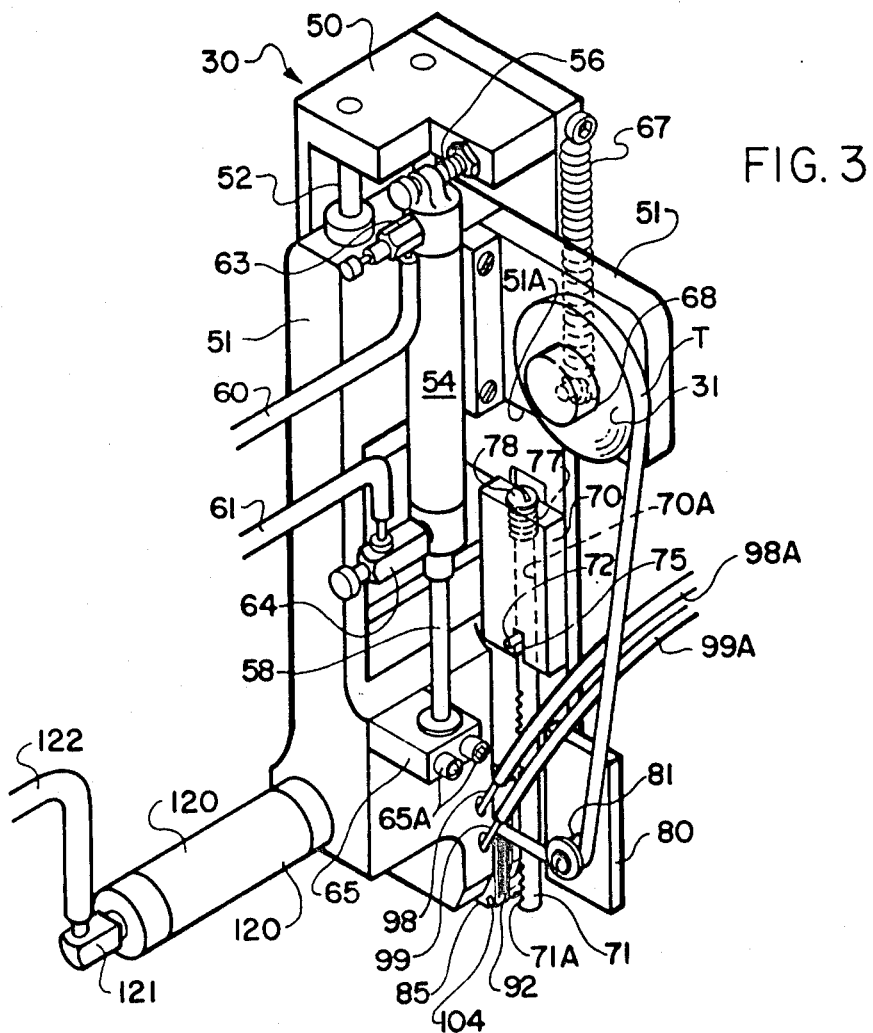

Referring now to FIG. 3, splicer 30 is mounted in a stationary position on front panel 12 of winder 10 by means of a base, referred to as a splicer support block 50. A splice block 51 is mounted on splicer support block 50 for reciprocating up and down motion along a vertically extending splice block guide rail 52, carried by the upper end of splicer support block 50.

Reciprocating up and down motion of splice block 51 is effected by a two-way pneumatic splice cylinder 54 which is mounted to the splicer support block 50 by a splice cylinder mounting bolt 56. A splice piston rod 58 is slidably positioned in splice cylinder 54 and connected to a piston (not shown) for movement in response to air pressure within splice cylinder 54. Splice cylinder 54 is a two-way cylinder and is provided with a down piston supply tube 60 and an up piston supply tube 61. Flow valves 63 and 64 cooperate with down piston supply tube 60 and up piston supply tube 61, respectively, to control the flow of air into the cylinder. Splice piston rod 58 is secured by the end remote from splice cylinder 54 to a piston rod mount 65 and is removable by loosening two screws 65a.

By introducing compressed air through down piston supply tube 60 into splice cylinder 54, piston rod 58 is extended outwardly from within cylinder 54, causing splice block 51 to move downwardly along guide rail 52. Introducing compressed air from up piston supply tube 61 into splice cylinder 54 causes piston rod 58 to be retracted within splice cylinder 54, and the attached splice block 51 to be moved upwardly.

Splice block 51 is assisted in its return to the upper position by a splice block return assist spring 67, the upper end of which is attached to the stationary splicer support block 50 and the lower end of which is attached to splice block 51. Spring 67 also reduced the force of the downward movement of splice block 51 under the combined influence of gravity and splice cylinder 54.

A spool 31 of splicing tape "T" is carried by a splicing tape spool mount 68 connected to and moving in unison with splice block 51.

A rack mounting block 70 is carried by the stationary splicer support block 50. An elongate rack 71 having a length of rack teeth along one side is positioned within a vertical bore 70a in rack mounting block 70 and is normally stationary with splicer support block 50. A rack alignment pin 72 extends radially outwardly from rack 71 and rides within a recess 75 in rack mounting block 70.

Rack alignment pin 72 keeps the rack teeth 71a properly aligned. Recess 75 permits rack pin 72 and consequently rack 71 to move in the vertical direction to a limited degree. Rack 71 is preferably provided with an enlarged head 78 on its upper end. Bore 70a has a sufficiently large diameter in its upper end to accommodate enlarged head 78 so that rack 71 can be urged downwardly until enlarged head 78 is flush with the upper surface of rack mounting block 70. Rack 71 is held in a normally raised position with enlarged head 78 exposed by means of a rack return spring 77. The purpose of this arrangement is described in detail below.

A guide bearing mount 80 is also positioned on the movable splice block 51 and carries a guide bearing 81. Adhesive splicing tape from splicing tape spool 31 is properly positioned for application by guide bearing 81 around which the splicing tape passes.

An applicator wheel 85 is integrally formed with a cylindrical mounting sleeve 86 and a concentrically formed, square ratchet mount bushing 87 having a screw receiving bore 88 therein. Applicator wheel 85 is mounted to splice block 50 by inserting mounting sleeve 86 in the annular bore 89. Bore 89 is sized so that mounting sleeve 86 is held by a slight press fit for rotation therein. Ratchet mount bushing 87 extends through the end of bore 89 opposite applicator wheel 85. A ratchet 90 is mounted on ratchet mount bushing 87. Since ratchet mount bushing 87 is square, the ratchet 90 and applicator wheel 85 always rotate in unison. Mounted between ratchet 90 and splice block 51 is a rack gear 92. As is best shown in FIG. 5, rack gear 92 is provided with gear teeth 92a around approximately a 90° arc, which teeth 92a mate with teeth 71a on rack 71. Rack gear 92 therefore operates as a motion transmitting body which converts vertical movement of splice block 51 relative to the stationary rack 71 into rotation of applicator wheel 85. A pawl 93 is mounted eccentrically on rack 92 and mates with notches between the wave-shaped teeth on pawl 93. Pawl 93 is normally held in mating engagement with ratchet 90 by means of spring 95 tensioned between a screw 95a on pawl 93 and a screw 95b on rack gear 92.

Ratchet 90 is retained on ratchet mount bushing 87 by means of a ratchet mounting screw 90a which is threaded into screw bore 88.

Counterclockwise rotation of rack gear 92 during upward movement of splice block 51 causes pawl 93 to ride up over one of the wave-shaped teeth in ratchet 90. As a result, applicator wheel 85 is not forced to rotate. Conversely, downward movement of splice block 51 causes clockwise rotation of rack gear 92. (FIG. 5). Pawl 93 matingly engages one of the notches as ratchet 90 rotates. Therefore, applicator wheel 85 turns one-quarter turn during each downward movement of splice block 51.

Figure 4:
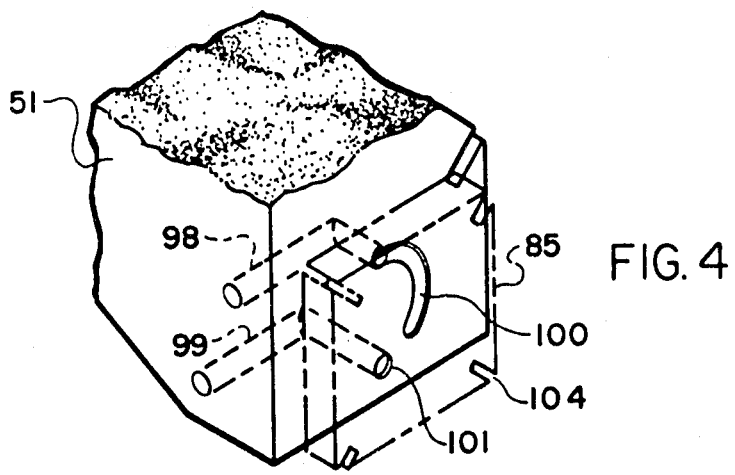

As is shown in FIG. 4, splice block 51 is provided with two conduits, 98 and 99. Conduit 98 comprises a constant vacuum conduit which communicates with a flush surface of splice block 51 against which applicator wheel 85 sealingly engages and rotates. The constant vacuum conduit 98 communicates with a constant vacuum port manifold 100 which has a crescent shape. During operation of the winder, negative air pressure is constantly present in constant vacuum conduit 98 and constant vacuum port manifold 100. Variable pressure conduit 99 communicates with a variable pressure port manifold 101. As the name implies, pressure in conduit 99 and manifold 101 varies between negative pressure, positive pressure and atmospheric pressure as described in further detail below.

Referring now to FIGS. 7, 8 and 9, applicator wheel 85 is substantially square. Each corner is truncated to provide a flat corner surface 103 into which is formed a cutter blade access slot 104. In the description that follows, the four sides of applicator wheel 85 will be arbitrarily referred to as 85a, 85b, 85c and 85d, respectively. Each of the four sides 85a–d comprise planar tape carrying surfaces. On each tape carrying surface 85a–d is formed a pair of ports 106a, 106b, 106c and 106d, respectively. Ports 106a–d are formed in the body of applicator wheel 85 so that they each define a radius and communicate with manifold access holes 107a, 107b, 107c and 107d, respectively. As is shown in FIG. 9, holes 107a–d communicate with one side of applicator wheel 85. This one side of applicator wheel 85 is fitted for rotation against the surface of splice block 51 into which the manifolds 100 and 101 are formed. Therefore, as applicator wheel 85 is rotated, one or more of the ports 106a–d communicate selectively with manifolds 100 and/or 101.

Tape "T" is applied to applicator wheel 85 in a continuous length. Therefore, the tape must be cut into appropriate length sections. This is accomplished by means of a reciprocating cutter blade assembly. Reciprocating movement is provided by a tape cutter cylinder 120 which is supplied with pressurized air through a nipple 121 by a cutting cylinder air supply tube 122

Figure 1:
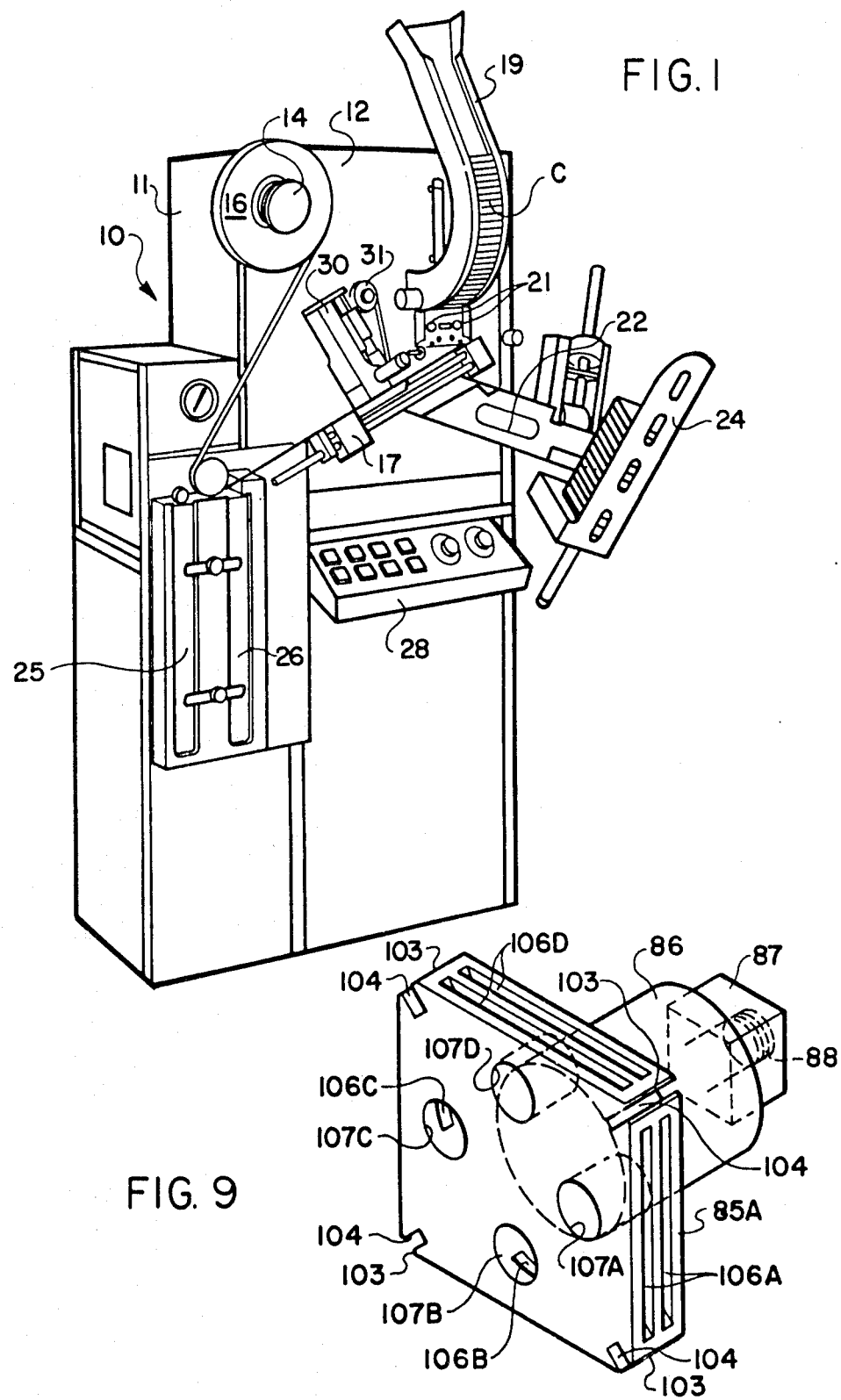
FIG. 1 is a perspective view of an audio cassette tape winder and attached splicing apparatus according to the present invention.

(FIG. 3). Referring to FIG. 6, tape cutter cylinder 120 moves a tape cutter piston rod 123 through a slot 124 formed in splice block 51. A blade carrier 125 carries a cutter blade 127. As is best shown in FIGS. 6 and 11, cutter blade 127 slides into one of the blade access slots 104 aligned therewith, cutting splicing tape "T" into a segment approximately the same length as each of the tape carrying surfaces 85a–d of applicator wheel 85. In the particular embodiment shown in FIGS. 1 and 6, the tape cutter cylinder 120 is a one-way cylinder with the tape cutter piston rod 123 being returned to its normal, retracted position by a spring (not shown). As is apparent, a two-way cylinder of the same type as the splice cylinder 54 could be used instead.

The two tape ends to be spliced are held in position by means of a splicing bed 130, the precise construction of which may vary considerably from one type of winder to another. In the preferred embodiment disclosed herein, the splicing bed 130 includes a planar, longitudinally extending upper surface 131. A plurality of longitudinally extending and spaced-apart ports 132 are formed in splicing bed 130 communicating with a source of suction (not shown) in a conventional manner. The two tapes to be spliced may be two lengths of audio or video recording tape, a length of leader to either audio or video recording tape, or any other of a wide variety of combinations of leader to tape, film or other substances. For purposes of illustration a length of leader tape "L" is shown positioned on the upper surface 131 of splicing bed 130 in abutting relation to a length of audio recording tape "A". As is shown in FIG. 10, the tapes very nearly abut at a point directly beneath applicator wheel 85 in splicing tape "T" receiving position.

Positive and negative air pressure is provided by means of a pneumatic system mounted in winder console 11. Referring to FIG. 18, the pneumatic system comprises an electronic control system and power supply 140 of conventional design operatively connected to solenoid operated pneumatic valves 141, 142, 143 and 144. The system also includes a source of pressurized air 146 and a source of negative air pressure, or vacuum, 147.

Pressurized air source 146 is connected to valve 141 by conduit 150. Activation of the solenoid interconnects valve port 141b with valve port 141c causing pressurized air to extend the cutter piston rod 123. Return of solenoid 141 to its off position at valve port 141a causes the cutter piston rod 123 to retract, as described above. Pressurized air source 146 is connected to solenoid valve 142 by means of a conduit 151. Solenoid 142 activates the splice cylinder 54 in a downward direction by connection of valve port 142d to valve port 142a. Since splice cylinder 54 is a two-way operating cylinder, movement of the splice piston rod 58 upwardly into cylinder 54 thereby retracting splice block 51, takes place by interconnection of valve ports 142d and 142b. This position is shown in FIG. 18. "Off" positions 142c and 142e operate, respectively, to disconnect the inactive side of splice cylinder 54 from conduit 151.

A constant supply of vacuum is supplied by vacuum supply tube 98a which interconnects constant vacuum conduit 89a with negative air pressure source 147. Vacuum supply tube 98a is not directed through one of the solenoid valves. For this reason, vacuum is supplied to manifold 100 constantly during operation of the winder.

Solenoid valves 143 and 144 cooperate to supply variable air pressure to the variable pressure port manifold 101. Pressurized air is supplied to solenoid valve 143 by conduit 153 interconnected to valve port 143a. With valve port 143c interconnected with valve 143a, pressurized air is supplied to manifold 101. Negative air pressure is supplied to manifold 101 through solenoid valve 144. The variable pressure supply tube 99a interconnects valve port 143b and valve port 144c, and valve port 144b and the negative air pressure source 147. With solenoid 143 switched to interconnect ports 143c and 143b and with solenoid 144 switched to connect valve ports 144c and 144b, negative air pressure is supplied to manifold 101. When neither positive nor negative air pressure is desired in manifold 101, solenoid 144 is switched to connect valve port 144c with valve port 144a, shutting off all air flow and opening manifold 101 to atmospheric air pressure only.

The switching of the various solenoid valves is controlled by the programable electronic control system 140 of conventional design.

Operation of the splicer 30 begins with the mechanism in substantially the position shown in FIG. 10. Pressurized air is supplied by solenoid 142 to up piston supply tube 61 to splice cylinder 54. Splice block 51 is therefore in its raised position as shown in FIG. 3. Tape "T" is held on surfaces 85a and 85b of applicator wheel 85 by suction through ports 106a and 106d respectively. Suction is provided to ports 106a and 106d through the constant vacuum port manifold 100 from the negative air pressure source 147. While applicator wheel 85 is stationary and in the position shown in FIG. 10, the cutter cylinder 120 is activated by solenoid 141, extending cutter piston rod 123 and the attached cutter blade 127. Blade 127 extends into blade access slot 104 severing tape "T". Applicator wheel 85 is now ready to begin its downward travel into splice applying position.

Referring now to FIGS. 5 and 12, solenoid 142 has deactivated the up piston supply tube 61 and simultaneously activated down piston supply tube 60, conveying pressurized air to the top of splice cylinder 54, driving splice block 51 downwardly. As splice block 51 translates, i.e. moves vertically downwardly, this vertical movement is translated into unison clockwise rotary movement of rack gear 92. Because rack gear 92 is rotating clockwise, ratchet 90 and pawl 93 cooperate to cause simultaneous, unison rotation of applicator wheel 85. As is therefore illustrated in FIG. 12, tape applying surface 85a has rotated approximately 45° and is moving into position to apply a length of splicing tape to the abutted tapes to be spliced, "A" and "L". Splicing tape "T" is maintained on tape applying surface 85a and 85d by continuing suction through ports 106a and 106d, respectively. The vacuum is constant because of the crescent shaped constant vacuum port manifold 100 which permits uninterrupted communication between manifold access holes 107a and 107d as rotation of applicator wheel 85 takes place. As is also shown in FIG. 12, manifold access holes 107b and 107c are not in alignment with either manifold 100 or 101, therefore, atmospheric pressure only is present in ports 106b and 106c.

While, as mentioned above, vacuum pressure plays a primary role in maintaining tape "T" on tape applying surfaces 85a and 85d, the possibility of misalignment or skewing of the tape is nevertheless present. In order to support and align tape "T" during rotation of applicator wheel 85, the opposing walls of splice block 51 between which applicator wheel 85 is mounted define first and second supports which lie flush with and overlap the tape carrying surfaces of applicator wheel 85 on both its axial sides. Since splice block 51 moves in unison translation with applicator wheel 85, these flush surfaces ensure that tape "T" stays in precise alignment on surfaces 85a and 85d during application of tape "T" onto the applicator wheel surfaces 85a-d and during rotation of applicator wheel 85. At the point in the rotation of applicator wheel 85 illustrated in FIG. 12, rack 71 is stationary.

Referring now to FIG. 13, applicator wheel 85 has now rotated precisely 90° from its position in FIG. 10. Tape carrying surface 85a now faces downwardly and is parallel with the two tapes to be spliced, "A" and "L". Rack gear 92 has rotated to the maximum extent possible. Consequently, no further downward movement of splice block 51 can be converted to rotation of applicator wheel 85. Still referring to FIG. 13, tape carrying surface 85c has rotated forward and is now covered with splicing tape "T". Manifold access hole 107c is in alignment with constant vacuum port 100. Vacuum is therefore retaining tape "T" on surface 85c. Tape "T" carried by tape carrying surface 85d is likewise in communication with constant vacuum port manifold 100 through manifold access hole 107d. Since tape carrying surface 85b is not in position to receive tape "T", only atmospheric pressure is present in port 106b. In the position shown in FIG. 13, manifold access hole 107a is now in alignment with variable pressure port manifold 101. Vacuum is still being supplied to variable pressure port manifold 101 through the cooperation of solenoid valves 143 and 144, as described above.

To effect a completely uniform and secure splice, it is important that tape carrying surface 85a impacts tapes "A" and "L" in a completely flush, parallel position. Therefore, parallel relation between tape carrying surface 85a and splice bed 130 is established at the position shown in FIG. 13. A shoulder 51a on splice block 51 below the spool of splicing tape 31 is shown in its course of downward movement slightly above the upper surface of rack mounting block 70 and in exact alignment with head 78 of rack 71. The upper surface of rack mounting block 70 defines the limit of downward movement of splice block 51 since impact therebetween prevents any further downward movement. Head 78 of rack 71 is adjustable so that the distance it projects upwardly above the upper surface of rack mounting block 70 can be varied to ensure that tape carrying surface 85a is exactly parallel to splice bed 130 at the position shown in FIG. 13.

Referring now to FIG. 14, splice block 51 has continued downwardly to its maximum extent of downward travel, with shoulder 51a flush with the upper surface of rack mounting block 70. In so doing, rack 71 has been moved downwardly causing head 78 to retract. As is evident, movement of rack 71 under the direct impact of splice block 51 is unison therewith, causing rack 71 to move downwardly at exactly the same speed as rack gear 92 and applicator wheel 85. The instant cessation of rotary movement of applicator wheel 85 therefore maintains tape carrying surface 85a in exact parallel position to properly apply tape "T" to abutted tapes "A" and "L". At the exact instant of impact between tape carrying surface 85a and splicing bed 130, solenoid 143 switches from negative air pressure source 147 to pressurized air source 146 by connecting valve ports 143a and 143c. Positive air pressure flows through variable pressure port manifold 101 into manifold access hole 107a and through port 106a, blowing tape "T" off of tape carrying surface 85a and into contact with tapes "A" and "L".

The advantage of blowing tape "T" off of the tape carrying surface 85 is illustrated in FIGS. 16 and 17. FIG. 16 illustrates a hypothetical prior art device with a leader "L" held onto a splice bed by suction as in the present invention. Though exaggerated, FIG. 16 illustrates that the leader directly over a vacuum port is drawn downwardly slightly into the port. This creates a space directly above this indention to which the splicing tape "T" will not be affixed as it is applied. This is true with the use of any type of mechanical splicing tape applicator, whether the splicing tape is held on the applicator by suction or by some other means. However, the problem is particularly severe when the splicing tape itself is deformed upwardly by suction as is shown in FIG. 16. In some cases, the weakness in the splice caused by the lack of adhesion in these recessed areas is sufficient to cause the splice to break either immediately or at some subsequent time during winding, rewinding or playing the tape.

In accordance with the present invention, FIG. 17 illustrates that positive air pressure through ports 106a causes splicing tape "T" to conform to the irregularities caused in leader "L" as a result of the action of the suction through vacuum ports 132. This results in a much stronger splice which is far less susceptible to separation during subsequent processing or use. It has also been observed that removal of the splicing tape "T" from tape carrying surface 85 by positive air pressure reduces the tendency of the tape to partially separate from leader "L" and tape "A" when applicator wheel 85 begins its upward movement.

Referring now to FIG. 15, splicing tape "T" has been applied to the abutted leader "L" and tape "A". Solenoid valve 142 has deactivated valve ports 142c and 142a, and simultaneously activated valve ports 142d and 142b. Up piston supply tube 61 supplies pressurized air to splice cylinder 54 causing splice piston rod 58 to retract into cylinder 54, driving the splice block 51 upwardly. As splice block 51 moves upwardly, rack 71 under the urging of spring 78 returns to its normal, raised position, rack 71 and applicator wheel 85 move vertically upward in unison.

As splice block 51 moves upwardly, rack gear 92 rotates in a counterclockwise direction. Because of the counterclockwise direction of movement of rack gear 92, pawl 93 slides up over one of the teeth of ratchet 90, thereby enabling ratchet 90 to turn while permitting applicator wheel 85 to remain stationary. Positive pressure continues for an instant after splicing tape "T" is applied, in order to keep dirt and debris out of the flow path, then solenoid 145 activates valve connection 144c and 144a so that only atmospheric pressure is present in port 106a. Tape carrying surface 85d now becomes the surface which will actually apply the splicing tape "T" during the next splicing operation. Rack gear 92 continues its counterclockwise rotation as splice block 51 moves upwardly, until rack gear 92 and splice block 51 have again assumed the position shown in FIG. 10. At this point, the steps described above repeat when the electronic control system next activates the splicing mechanism.

In the embodiment described herein, the splicing tape spool 31 moves in unison with splice block 51. An additional length of splicing tape is pulled onto the applicator wheel 85 during the downward movement of splice block 51, as illustrated in FIG. 12. However, in an alternative embodiment, splicing tape spool 31 could be mounted on the front panel 12 of winder 10 in which case splicing tape "T" would be dispensed onto applicator wheel 85 either during the downward movement illustrated in FIG. 12, or the upward stroke illustrated in FIG. 15, depending upon the position of spool 31. By preventing applicator wheel 85 from rotating during the upward movement of splice block 51, each successive tape carrying surface is in turn provided with a length of tape and maintained in the correct position to apply the length of splicing tape during the next reciprocation downwardly of applicator wheel 85.

Applicator wheel 85 may be constructed of a number of suitable materials. In the embodiment described herein, applicator wheel 85 is fabricated from a block of high density polyurethane which while relatively hard (60 durometer) is nevertheless slightly yieldable under pressure so that shock from the impact of applicator wheel 85 against splicing bed 130 is absorbed in the slight compression of the polyurethane. Likewise, fitting the applicator wheel against manifolds 100 and 101 is more easily accomplished, since any minute irregularities in either adjacent surface can be accommodated much more easily than if two hard metal surfaces were in contact. In addition, since the applicator wheel 85 is relatively small, its fabrication is much easier than would be the case if it were made of stainless steel or some other hard metal. The polyurethane material is easily drilled to form manifold access holes 107a-107d. A very small saw is used to cut ports 106a-106d into the four tape carrying surfaces 85a-85d, and the blade access slots 104.

A tape splicer is described above. Various details of the invention may be changed without departing from its scope. Furthermore, the foregoing description of a preferred embodiment according to the present invention is provided for the purpose of illustration only and not for the purpose of limitation—the invention being defined by the claims.

I claim:

1. In a tape splicing apparatus of the type wherein splicing tape is applied to a splicing tape applicator wheel having a plurality of planar, tape carrying surfaces, said applicator wheel adapted for movement to and from two tape ends to be spliced whereby the tape carrying surface contacts the two tape ends and applies the splicing tape thereto in lateral and longitudinal alignment therewith, the improvement which comprises:

(a) a first support lying flush with and overlapping substantially all of the tape carrying surface of the applicator on one axial side thereof and mounted for unison translation with said applicator;

(b) a second support lying flush with and overlapping substantially all of the tape carrying surface of said applicator on the other side thereof and also mounted for unison translation with said applicator, said first and second supports defining therebetween a splicing tape path substantially the same width as the splicing tape which guides the splicing tape onto the tape applying surface of the applicator and maintains proper lateral and longitudinal alignment of the splicing tape with the two tape ends to be spliced during movement of the applicator wheel;

(c) extension means cooperating with said first and second supports and said applicator for extending the tape carrying surface to a plane beyond the extent of said first and second supports immediately prior to its contact with the two tape ends to be spliced so as not to interfere with the application of the tape;

(d) port means communicating with each of the planar tape carrying surfaces of said applicator wheel; a source of negative air pressure communicating with said port means and adapted for aiding and retaining the splicing tape on the tape carrying surface of said applicator wheel while said applicator wheel is rotated into position for application of the tape to the two tape ends to be spliced and further wherein said two tape ends to be spliced are held in splicing position by means of negative air pressure;

(e) including a source of positive air pressure communicating with said port means and air pressure control means for applying negative air pressure to the splicing tape to hold the splicing tape on the tape carrying surface until the instant of contact with the tape ends to be spliced and upon contact applying positive air pressure to said splicing tape to aid in removing the splicing tape from the tape carrying surface and mating the splicing tape to and firmly adhering the splicing tape to the tape ends to be spliced without air pockets between the respective tapes.

2. In a tape splicing apparatus according to claim 1 wherein said means for extending the tape carrying surface to a plane beyond the extent of said first and second supports comprises means for rotating said successive tape carrying surfaces into position parallel with the two tapes to be spliced in advance of the application of the splicing tape thereto.

3. In a tape splicing apparatus according to claim 1 wherein said source of positive and negative air pressure includes manifold means in one of said first support or said second support for conveying positive or negative air pressure from said source to said port means on said applicator wheel.

4. In a tape splicing apparatus according to claim 1 and including ratchet and pawl means cooperating with one of said first support or said second support for rotating said applicator wheel during movement to the two tape ends to be spliced and preventing rotation of said applicator wheel during movement from said two tape ends.

* * * * *